United States Patent
Kelch et al.

(10) Patent No.: US 11,149,106 B2
(45) Date of Patent: Oct. 19, 2021

(54) TWO-COMPONENT POLYURETHANE ADHESIVE HAVING SUBSTANTIALLY TEMPERATURE-INDEPENDENT MECHANICAL PROPERTIES AND HIGH STRENGTH

(71) Applicant: SIKA TECHNOLOGY AG, Baar (CH)

(72) Inventors: Steffen Kelch, Oberengstringen (CH); Urs Burckhardt, Zürich (CH)

(73) Assignee: SIKA TECHNOLOGY AG, Baar (CH)

( * ) Notice: Subject to any disclaimer, the term of this patent is extended or adjusted under 35 U.S.C. 154(b) by 353 days.

(21) Appl. No.: 16/321,072

(22) PCT Filed: Jul. 28, 2017

(86) PCT No.: PCT/EP2017/069141
§ 371 (c)(1),
(2) Date: Jan. 28, 2019

(87) PCT Pub. No.: WO2018/024626
PCT Pub. Date: Feb. 8, 2018

(65) Prior Publication Data
US 2019/0169354 A1    Jun. 6, 2019

(30) Foreign Application Priority Data
Aug. 3, 2016 (EP) .................................. 16182609

(51) Int. Cl.
*C08G 18/69* (2006.01)
*C08G 18/20* (2006.01)
(Continued)

(52) U.S. Cl.
CPC ......... *C08G 18/69* (2013.01); *C08G 18/2027* (2013.01); *C08G 18/222* (2013.01);
(Continued)

(58) Field of Classification Search
CPC ..................................................... C08G 18/69
See application file for complete search history.

(56) References Cited

U.S. PATENT DOCUMENTS

| | | |
|---|---|---|
| 6,060,560 A | 5/2000 | St. Clair |
| 6,388,010 B1 | 5/2002 | St. Clair |
| 2015/0259465 A1* | 9/2015 | Burckhardt ............. B29B 7/726 428/423.1 |

FOREIGN PATENT DOCUMENTS

| | | |
|---|---|---|
| CN | 101039947 A | 9/2007 |
| CN | 105189594 A | 12/2015 |

(Continued)

OTHER PUBLICATIONS

Nov. 3, 2017 International Search Report issued in International Patent Application No. PCT/EP2017/069141.

*Primary Examiner* — Daniel H Lee
(74) *Attorney, Agent, or Firm* — Oliff PLC (57) ABSTRACT

A two-component polyurethane composition containing at least 55% by weight of polybutadiene polyols based on the total amount of all polyols having an average molecular weight of at least 500 g/mol, and at least one latent hardener, where the ratio of the number of reactive groups in the latent hardener to the number of OH groups present is in the range from 0.02 to 0.4. The composition has a long open time, blister-free curing, a very low glass transition temperature, high elasticity and surprisingly high strength which is very constant over a wide temperature range. Furthermore, it has very good adhesion to metallic and nonmetallic substrates, causing barely any stress cracks on glassy thermoplastics.

15 Claims, 1 Drawing Sheet (51) Int. Cl.
  *C08G 18/79* (2006.01)
  *C08G 18/22* (2006.01)
  *C08G 18/32* (2006.01)
  *C09J 175/04* (2006.01)
  *C08G 18/42* (2006.01)
  *C08G 18/76* (2006.01)
  *C09J 175/14* (2006.01)

(52) U.S. Cl.
  CPC ..... *C08G 18/3256* (2013.01); *C08G 18/3262* (2013.01); *C08G 18/3296* (2013.01); *C08G 18/4238* (2013.01); *C08G 18/7664* (2013.01); *C08G 18/797* (2013.01); *C09J 175/04* (2013.01); *C09J 175/14* (2013.01); *C09J 2425/006* (2013.01); *C09J 2433/006* (2013.01); *C09J 2469/006* (2013.01)

(56) References Cited

FOREIGN PATENT DOCUMENTS

| | | |
|---|---|---|
| DE | 698 20 615 T2 | 6/2004 |
| WO | 2007/036574 A1 | 4/2007 |
| WO | 2014/040922 A1 | 3/2014 |
| WO | 2014/184264 A1 | 11/2014 |

\* cited by examiner

TWO-COMPONENT POLYURETHANE ADHESIVE HAVING SUBSTANTIALLY TEMPERATURE-INDEPENDENT MECHANICAL PROPERTIES AND HIGH STRENGTH

TECHNICAL FIELD

The invention relates to the field of elastic two-component polyurethane adhesives.

PRIOR ART

Structural adhesives based on polyurethanes are frequently used in the manufacturing industry, especially as construction and assembly adhesives, in order to bond components to one another such that the adhesive bond is part of a permanently durable construction. Adhesives of this kind are typically elastic and have to fulfill high demands in relation to their processability, strength and bonding forces.

Such an adhesive should have good processability and be usable in relatively high layer thicknesses of up to 10 mm or more, and cure either at ambient temperature or in a heat-accelerated curing process in a defect-free manner to give the final strength. In addition, it should have good adhesion to painted metallic substrates and substrates having low surface energy. Finally, the adhesive, in the region of its use temperature, which is typically in the range from about −40 to 90° C., should exhibit very uniform mechanical characteristics without any abrupt changes in strength and modulus of elasticity in the event of temperature changes.

For applications of this kind, the use of two-component polyurethane adhesives based on hydrophobic polyols, especially polybutadiene polyols, has long been known. Adhesives of this kind generally have low water absorption, have barely any tendency to blistering in the course of curing, and show good aging resistance. Moreover, the buildup of adhesion on low-energy surfaces such as polyolefins or polycarbonates is usually good. In addition, such adhesives typically have a glass transition temperature below −45° C., which is very low for two-component polyurethanes and enables very homogeneous mechanical characteristics within a wide temperature range. But their mechanical strength is inadequate for many applications. It would be desirable to increase that without impairing the favorable temperature characteristics. Typically, when hard segments are incorporated, for example via additional use of chain extenders such as butanediol or amine hardeners, the glass transition temperature is increased and/or two or more glass transition temperatures are observed in the cured material, which results in an undesirably significant change in the mechanical characteristics in the region of the use temperature. Moreover, this often also undesirably significantly shortens the processing time of the adhesive.

A further advantage of two-component polyurethane adhesives based on polybutadiene polyols is that these can be formulated without additional use of plasticizers, and so migration of the plasticizer out of the adhesive, for example into adjoining substrates, which can lead to deterioration of the adhesive properties is avoided. This is advantageous especially in the case of bonding of glassy thermoplastics such as polycarbonate, polymethylmethacrylate or polystyrene, where migration of plasticizer from the adhesive into the substrate can lead to the occurrence of stress cracks in the substrate. This phenomenon is also referred to as environmental stress cracking.

WO2014/040922 describes two-component polyurethane adhesives comprising at least one polyol, at least one polyisocyanate and at least one blocked amine, which cure with bismuth(III) or zirconium(IV) catalysts. Preferably, the blocked amine is present in such an amount that the ratio of the number of reactive groups therein in relation to the number of OH groups is in the range from 0.1 to 1. The examples are executed with a ratio close to 0.5. The mechanical properties of the compositions executed are not close to the advantageous properties described here. More particularly, the compositions disclosed do not have glass transition temperatures below −45° C. There are no pointers in this document as to the way in which a material having the required properties can be obtained.

SUMMARY OF THE INVENTION

It is therefore an object of the present invention to provide a two-component polyurethane composition which has good processability, cures rapidly and in a blister-free manner to give an elastic material having a very low glass transition temperature, preferably below −45° C., especially below −50° C., and at the same time has high strength, mechanical properties that are very substantially uniform within a wide temperature range, and good bonding properties. This object is surprisingly achieved by the composition described in claim 1. This composition comprises a combination of polybutadiene and latent hardener, the latent hardener being present only in a selected, very small amount. Surprisingly, the composition of the invention shows distinctly elevated strength compared to a composition without latent hardener, with a uniformly low glass transition temperature and uniformly very constant mechanical characteristics over a wide temperature range. When the content of latent hardener is increased beyond the range of the invention, by contrast, a distinct deterioration in the mechanical properties is observed.

Also surprising is the fact that the composition of the invention causes barely any stress cracking in glassy thermoplastics such as polycarbonate, even though it would be expected that aldehydes or ketones released from the latent hardener in the course of curing would cause this.

It is also particularly surprising that, when DABCO is used as catalyst, the tendency to stress cracking in the substrate is particularly low and the mechanical properties of the composition are particularly good, whereas, in WO2014/040922, distinctly reduced strengths and extensibilities were observed with DABCO as catalyst.

It was also found that the composition of the invention is surprisingly robust in relation to curing at high temperatures, especially in the range from 60 to 130° C., where materials of high quality are obtained even with such curing conditions. Thus, the curing time of a bond can be shortened by application of heat, which is advantageous in industrial manufacture.

The composition described has very advantageous properties. It has a long open time and can thus be efficiently handled in practice. Curing proceeds in a blister-free manner, even under unfavorable climatic conditions such as high air humidity and with accelerated curing by means of heat. It has high elasticity, surprisingly high strength and a very low glass transition temperature, and the mechanical properties are very constant within a wide temperature range from about −40 to 90° C. Furthermore, it has very good adhesion to metallic and nonmetallic substrates, giving rise to barely any stress cracks on contact with glassy thermoplastics. It is thus of excellent suitability as structural elastic adhesive for bonds that are stressed within a wide temperature range. Further aspects of the invention form the subject matter of further independent claims. Particularly preferred embodiments of the invention form the subject matter of the dependent claims.

WAYS OF EXECUTING THE INVENTION

The invention provides a composition consisting of
a first component comprising at least 55% by weight of polybutadiene polyols having an average molecular weight in the range from 2,000 to 10,000 g/mol and an average OH functionality in the range from 2.1 to 4, based on the total amount of all polyols having an average molecular weight of at least 500 g/mol, and
a second component comprising at least one polyisocyanate, where at least one of the two components additionally comprises at least one latent hardener,
characterized in that the ratio of the number of reactive groups in the latent hardener to the number of OH groups present is in the range from 0.02 to 0.4.

In the present document, a "latent hardener" refers to a substance having at least two groups that are reactive toward isocyanates, at least one of which has been blocked in terms of its reactivity and is activatable by means of moisture.

"Reactive groups in the latent hardener" refer to all groups in the latent hardener that are reactive toward isocyanate groups after they have been activated by means of moisture.

In the present document, "molecular weight" is understood to mean the molar mass (in grams per mole) of a molecule. "Average molecular weight" is understood to mean the number-average $M_n$ of an oligomeric or polymeric mixture of molecules, which is typically determined by means of gel permeation chromatography (GPC) against polystyrene as standard.

"Polyol having an average molecular weight of at least 500 g/mol" refers to a technical grade mixture of OH-functional substances having an average OH functionality of at least 1.5 and an average molecular weight of at least 500 g/mol.

Substance names beginning with "poly", such as polyisocyanate or polyamine, refer to substances containing, in a formal sense, two or more of the functional groups that occur in their name per molecule.

A "primary hydroxyl group" refers to an OH group bonded to a carbon atom having two hydrogens.

A "primary amino group" refers to an amino group which is bonded to a single organic radical and bears two hydrogen atoms; a "secondary amino group" refers to an amino group which is bonded to two organic radicals which may also together be part of a ring and bears one hydrogen atom; and a "tertiary amino group" refers to an amino group which is bonded to three organic radicals, two or three of which may also be part of one or more rings, and does not bear any hydrogen atom.

In the present document, an "oxazolidino group" refers both to tetrahydrooxazole groups (5-membered ring) and tetrahydrooxazine groups (6-membered ring).

In this document, "open time" refers to the time within which the parts to be bonded have to be joined after the components of the composition have been mixed.

In the present document, the term "strength" refers to the strength of the cured composition, and strength especially means the modulus of elasticity, especially within the stretching range of 0.5% to 5%.

A substance or composition is referred to as "storage-stable" or "storable" when it can be stored at room temperature in a suitable container over a prolonged period, typically over at least 3 months up to 6 months or more, without any change in its application or use properties to a degree of relevance for the use thereof as a result of the storage.

"Room temperature" refers to a temperature of about 23° C.

A dotted line in the formulae in this document in each case represents the bond between a substituent and the corresponding molecular radical.

The two components of the composition are produced separately from one another and stored in separate moisture-tight containers until they are mixed with one another for application shortly before or during the application, and the composition ultimately cures.

The first component of the composition contains at least one polybutadiene polyol having an average molecular weight in the range from 2,000 to 10,000 g/mol and an average OH functionality in the range from 2.1 to 4.

The average molecular weight of the polybutadiene polyol is preferably in the range from 2,000 to 4,000 g/mol, especially in the range from 2,500 to 3,000 g/mol. A composition of this kind has particularly high strength.

The average OH functionality of the polybutadiene polyol is preferably in the range from 2.1 to 2.9, especially in the range from 2.3 to 2.7.

A polybutadiene polyol of this kind enables compositions having particularly high stretching.

A suitable polybutadiene polyol is especially obtainable by polymerization of 1,3-butadiene and allyl alcohol in a suitable ratio or by oxidation of suitable polybutadienes.

A suitable polybutadiene polyol especially contains structural elements of the formula (I) and optionally structural elements of the formula (II) or (III).

A preferred polybutadiene polyol contains
40% to 80%, especially 55% to 65%, of the structural element of the formula (I),
0% to 30%, especially 15% to 25%, of the structural element of the formula (II),
0% to 30%, especially 15% to 25%, of the structural element of the formula (III).

A particularly suitable polybutadiene polyol is Poly bd® R-45HTLO or Poly bd® R-45M (both from Cray Valley)

The first component contains at least 55% by weight of polybutadiene polyols based on the total amount of all polyols having an average molecular weight of at least 500 g/mol.

Preferably, the first component contains at least 65% by weight, more preferably at least 80% by weight, especially at least 85% by weight, of polybutadiene polyols based on the total amount of all polyols having an average molecular weight of at least 500 g/mol. A high content of polybutadiene polyols enables a particularly low glass transition temperature and particularly constant mechanical properties within a temperature range from about −40 to 90° C.

The second component of the composition comprises at least one polyisocyanate.

The polyisocyanate is especially a monomeric diisocyanate, or an oligomer or a polymer or a derivative of a monomeric diisocyanate, or any desired mixture thereof. Oligomers and polymers are understood here to mean homopolymers and -oligomers consisting exclusively of di- or triisocyanate constituents.

Suitable aromatic monomeric diisocyanates are especially tolylene 2,4- or 2,6-diisocyanate or any desired mixtures of these isomers (TDI), diphenylmethane 4,4'-, 2,4'- or 2,2'-diisocyanate or any desired mixtures of these isomers (MDI), mixtures of MDI and MDI homologs (polymeric MDI or PMDI), phenylene 1,3- or 1,4-diisocyanate, 2,3,5,6-tetramethyl-1,4-diisocyanatobenzene, naphthalene 1,5-diisocyanate (NDI), 3,3'-dimethyl-4,4'-diisocyanatodiphenyl (TODI) or dianisidine diisocyanate (DADI).

Among these, preference is given to MDI and TDI, especially MDI.

Suitable aliphatic monomeric diisocyanates are especially tetramethylene 1,4-diisocyanate, 2-methylpentamethylene 1,5-diisocyanate, hexamethylene 1,6-diisocyanate (HDI), 2,2(4),4-trimethylhexamethylene 1,6-diisocyanate (TMDI), decamethylene 1,10-diisocyanate, dodecamethylene 1,12-diisocyanate, lysine diisocyanate or lysine ester diisocyanate, cyclohexane 1,3- or 1,4-diisocyanate, 1-methyl-2,4- or -2,6-diisocyanatocyclohexane or any desired mixtures of these isomers (HTDI or $H_6$TDI), 1-isocyanato-3,3,5-trimethyl-5-isocyanatomethylcyclohexane (isophorone diisocyanate or IPDI), perhydro(diphenylmethane 2,4'- or 4,4'-diisocyanate) (HMDI or $H_{12}$MDI), 1,4-diisocyanato-2,2,6-trimethylcyclohexane (TMCDI), 1,3- or 1,4-bis(isocyanatomethyl)cyclohexane, m- or p-xylylene diisocyanate (m- or p-XDI), m- or p-tetramethylxylylene 1,3- or 1,4-diisocyanate (m- or p-TMXDI) or bis(1-isocyanato-1-methylethyl)naphthalene.

Among these, IPDI is preferred.

Suitable oligomers, polymers or derivatives of monomeric diisocyanates are especially derived from MDI, TDI, HDI or IPDI.

Preferably, the polyisocyanate comprises diphenylmethane 4,4'- or 2,4'- or 2,2'-diisocyanate or any mixture of these isomers (MDI).

Preferably, the polyisocyanate is MDI or a mixture of MDI and MDI homologs (polymeric MDI or PMDI) or a mixture of MDI and oligomers, polymers or derivatives derived therefrom.

More preferably, the polyisocyanate is a form of MDI which is liquid at room temperature, especially having a high content of diphenylmethane 4,4'-diisocyanate. What is called "liquid MDI" is either diphenylmethane 4,4'-diisocyanate liquefied by partial chemical modification—especially carbodiimidization or uretonimine formation—or it is a mixture of diphenylmethane 4,4'-diisocyanate with other MDI isomers (2,4'-diphenylmethane diisocyanate and/or 2,2'-diphenylmethane diisocyanate), or with MDI oligomers or MDI homologs, that has been brought about selectively by blending or results from the production process.

More particularly, the polyisocyanate is a monomeric MDI type having an elevated proportion of 2,4'-MDI, for example the commercially available products Desmodur® 2424 (from Bayer MaterialScience) or Lupranat® MI (from BASF), or a mixture of monomeric MDI and MDI homologs having a low proportion of homologs, for example the commercially available products Desmodur® VL50 (from Bayer MaterialScience) or Voranate® M 2940 (from Dow), or a partially carbodiimidized diphenylmethane 4,4'-diisocyanate, for example the commercially available products Desmodur® CD (from Bayer Material Science), Lupranat® MM 103 (from BASF), Isonate® M 143 or Isonate® M 309 (both from Dow), Suprasec® 2020 or Suprasec® 2388 (both from Huntsman).

With these polyisocyanates, particularly good processing properties and particularly high strengths are obtained.

In addition, the composition comprises at least one latent hardener which is present in the first or second component or in both components.

Preferably, the latent hardener is present in the first component.

A suitable latent hardener is a blocked amine having a blocked, hydrolytically activatable amino group and at least one further reactive group selected from the group consisting of hydroxyl group, mercapto group, secondary amino group, primary amino group and blocked, hydrolytically activatable amino group.

Blocked amines of this kind are substances that are known in polyurethane chemistry and are used as what are called latent hardeners in compositions having isocyanate groups. They are especially obtained from the condensation of at least one primary or secondary amine with at least one ketone or aldehyde.

Suitable ketones here are especially acetone, methyl ethyl ketone, methyl propyl ketone, methyl isopropyl ketone, methyl isobutyl ketone, methyl pentyl ketone, methyl isopentyl ketone, diethyl ketone, dipropyl ketone, diisopropyl ketone, dibutyl ketone, diisobutyl ketone, cyclopentanone, cyclohexanone or acetophenone.

Suitable aldehydes here are especially formaldehyde, acetaldehyde, propanal, 2-methylpropanal, butanal, 2-methylbutanal, 2-ethylbutanal, pentanal, 2-methylpentanal, 3-methylpentanal, 4-methylpentanal, 2,3-dimethylpentanal, hexanal, 2-ethylhexanal, heptanal, octanal, nonanal, decanal, undecanal, 2-methylundecanal, dodecanal, methoxyacetaldehyde, cyclopropanecarboxaldehyde, cyclopentanecarboxaldehyde, cyclohexanecarboxaldehyde, diphenylacetaldehyde, benzaldehyde, substituted benzaldehydes, especially benzaldehydes substituted by a branched alkyl group having 10 to 14 carbon atoms, or tertiary aldehydes, especially 2,2-dimethylpropanal (pivalaldehyde), 2,2-dimethyl-3-phenylpropanal, 2,2-dimethyl-3-acetoxypropanal, 2,2-dimethyl-3-isobutyroxypropanal, 2,2-dimethyl-3-caproyloxypropanal, 2,2-dimethyl-3-benzoyloxypropanal, 2,2-dimethyl-3-capryloyloxypropanal, 2,2-dimethyl-3-caprinoyloxypropanal, 2,2-dimethyl-3-lauroyloxypropanal, 2,2-dimethyl-3-myristoyloxypropanal, 2,2-dimethyl-3-palmitoyloxypropanal, 2,2-dimethyl-3-stearoyloxypropanal, 2,2-dimethyl-3-dimethylaminopropanal, 2,2-dimethyl-3-diethylaminopropanal, 2,2-dimethyl-3-dibutylaminopropanal, 2,2-dimethyl-3-(N-pyrrolidino)propanal, 2,2-dimethyl-3-(N-piperidino)propanal, 2,2-dimethyl-3-(N-morpholino)propanal, 2,2-dimethyl-3-(N-(2,6-dimethyl)morpholino)propanal, 2,2-dimethyl-3-(N-(4-methylpiperazino))propanal, 2,2-dimethyl-3-(N-(4-ethylpiperazino))propanal, 2,2-dimethyl-3-(N-benzylmethylamino)propanal, 2,2-dimethyl-3-(N-benzylisopropylamino)propanal, 2,2-dimethyl-3-(N-methylcyclohexylamino)propanal, 2,2-dimethyl-3-bis (2-methoxyethyl)aminopropanal, 2,2-dimethyl-3-bis(2-hydroxyethyl)aminopropanal or 2,2-dimethyl-3-bis(2-hydroxypropyl)aminopropanal.

Suitable primary or secondary amines from which the latent hardener or the blocked amine is derived are amines having at least one primary or secondary amino group and additionally at least one further reactive group selected from the group consisting of hydroxyl group, mercapto group, secondary amino group and primary amino group.

Preferably, the latent hardener is an oxazolidine or an aldimine wherein the aldimine groups are not tautomerizable to enamine groups, i.e. which do not have any hydrogen atoms in the alpha position to the carbon atom of the imine. These latent hardeners enable particularly long open times and can be stored over a prolonged period of time together with isocyanate groups with exclusion of moisture.

Preferably, the latent hardener contains two or three blocked amino groups and no further reactive groups, or it contains one blocked amino group and one further reactive group in the form of a hydroxyl group, mercapto group, primary amino group or secondary amino group. Preferably, the further reactive group is a hydroxyl group or a secondary amino group, especially a hydroxyl group. Latent hardeners of this kind enable compositions having a particularly long open time and hence good processability.

In a preferred embodiment of the invention, the latent hardener is an oxazolidine, especially a condensation product of diethanolamine with aldehydes or ketones to give an N-(2-hydroxyethyl)tetrahydrooxazole. Preferably, this is then converted by means of diisocyanates, especially HDI, or by means of diesters or carbonates, to a bisoxazolidine. Hydrolytic activation can release a secondary amino group and a hydroxyl group from every oxazolidine group.

Suitable commercial oxazolidines are especially Incozol® 3, Incozol® LV, Incozol® 4, Incozol® HP, Incozol® NC, Incozol® CF, Incozol® EH or Incozol® K (from Incorez).

In a further preferred embodiment of the invention, the latent hardener is an aldimine wherein the aldimine groups are not tautomerizable to enamine groups. Aldimines of this kind are especially derived from aromatic aldehydes such as benzaldehyde, substituted benzaldehydes or tertiary aliphatic aldehydes.

Preferably, an aldimine of this kind is based on a primary amine selected from the group consisting of pentane-1,3-diamine, 1,5-diamino-2-methylpentane, hexamethylene-1,6-diamine, 2,2(4),4-trimethylhexamethylenediamine, 1,2-, 1,3- and 1,4-diaminocyclohexane, 1-amino-3-aminomethyl-3,5,5-trimethylcyclohexane (isophoronediamine), 4(2)-methyl-1,3-diaminocyclohexane, 1,3-bis(aminomethyl)cyclohexane, 1,4-bis(aminomethyl)cyclohexane, bis(4-aminocyclohexyl)methane, bis(4-amino-3-methylcyclohexyl)methane, 2,5(2,6)-bis(aminomethyl)bicyclo[2.2.1]heptane (NBDA), 3(4),8(9)-bis(aminomethyl)tricyclo[5.2.1.0$^{2,6}$]decane, 1,3-bis(aminomethyl)benzene, 1,4-bis(aminomethyl)benzene, 3,6-dioxaoctane-1,8-diamine, 4,7-dioxadecane-1,10-diamine, 4-aminomethyloctane-1,8-diamine, polyoxyalkylenedi- and triamines having a molecular weight up to 6,000 g/mol, especially the D-230, D-400, D-2000, D-4000, T-403 and T-5000 products available under the Jeffamine® trade name from Huntsman and analogous compounds from BASF or Nitroil; phenylene-1, 3- and -1,4-diamine, tolylene-2,4(6)-diamine, 4,4'-, 2,4'- and 2,2'-diaminodiphenylmethane, 5-amino-1-pentanol, 6-amino-1-hexanol, 4-(2-aminoethyl)-2-hydroxyethylbenzene, 3-aminomethyl-3,5,5-trimethylcyclohexanol, 2-(2-aminoethoxy)ethanol, triethylene glycol monoamine, 3-(2-hydroxyethoxy)propylamine, 3-(2-(2-hydroxyethoxy)ethoxy)propylamine, 3-(6-hydroxyhexyloxy)propylamine, N-methylethane-1,2-diamine, N-ethylethane-1,2-diamine, N-cyclohexylethane-1,2-diamine, N-methylpropane-1,3-diamine, N-ethylpropane-1,3-diamine, N-butylpropane-1,3-diamine, N-cyclohexylpropane-1,3-diamine, 4-aminomethylpiperidine, 3-(4-aminobutyl)piperidine, N-cocoalkylpropane-1,3-diamine, N-oleylpropane-1,3-diamine, N-soyaalkylpropane-1,3-diamine and N-tallowalkylpropane-1,3-diamine.

Most preferably, the latent hardener is an aldimine of the formula (IV)

(IV)

where m is 0 or 1 and n is an integer from 1 to 3, where (m+n) is 2 or 3,

A is an (m+n)-valent hydrocarbyl radical optionally containing ether oxygen and having 2 to 20 carbon atoms, and Z is an optionally substituted aromatic radical or a radical of the formula where $R^1$ and $R^2$ are each independently a monovalent hydrocarbyl radical having 1 to 12 carbon atoms, or together are a divalent hydrocarbyl radical having 4 to 12 carbon atoms which is part of an optionally substituted carbocyclic ring having 5 to 8, preferably 6, carbon atoms, $R^3$ is a hydrogen atom or an alkyl or arylalkyl or alkoxycarbonyl radical having 1 to 12 carbon atoms, and Y is where $R^4$ is a monovalent hydrocarbyl radical optionally containing ether or aldehyde units and having 6 to 20 carbon atoms, and $R^5$ and $R^6$ are each independently a monovalent aliphatic, cycloaliphatic or arylaliphatic hydrocarbyl radical optionally containing heteroatoms in the form of hydroxyl groups or ether oxygen and having 2 to 20 carbon atoms, or together are a divalent aliphatic radical having 4 to 12 carbon atoms which is part of an optionally substituted heterocyclic ring having 5 to 8, preferably 6, ring atoms and as well as the nitrogen atom optionally contains further heteroatoms in the form of ether oxygen, thioether sulfur or tertiary amine nitrogen.

The aldimines of the formula (IV) are easily processable and enable compositions having a long open time and low odor or none at all.

Preferably, m is 0. A composition of this kind has particularly constant mechanical properties within a temperature range from about −40 to 90° C.

Preferably, A is either a di- or trivalent aliphatic or cycloaliphatic hydrocarbyl radical having a molecular weight in the range from 28 to 500 g/mol, or a di- or trivalent polyoxyalkylene radical having an average molecular weight in the range from 170 to 6,000 g/mol.

More preferably, A is selected from the group consisting of 3-oxa-1,5-pentylene, 2-methyl-1,5-pentylene, 1,6-hexylene, 2,2(4),4-trimethyl-1,6-hexamethylene, 1,2-cyclohexylene, (1,5,5-trimethylcyclohexan-1-yl)methane-1,3, 4(2)-methyl-1,3-cyclohexylene, 1,3-cyclohexylenebis(methylene), 1,4-cyclohexylenebis(methylene), methylenedicyclohexan-4-yl, (bicyclo[2.2.1]heptane-2,5(2,6)-diyl)dimethylene, (tricyclo[5.2.1.0$^{2.6}$]decane-3(4),8(9)-diyl)dimethylene, 1,3-phenylenebis(methylene), 1,4-phenylenebis(methylene), a,ω-polyoxypropylene having an average molecular weight in the range from 170 to 2,000 g/mol, trimethylolpropane- or glycerol-started tris(ω-polyoxypropylene) having an average molecular weight in the range from 330 to 5,000 g/mol, and 1,4-phenylene.

In a preferred embodiment, Z is a phenyl radical substituted by a branched alkyl group having 10 to 14 carbon atoms.

More preferably, Z is a radical of the formula where $R^7$ and $R^8$ are each an alkyl radical and together have 9 to 13 carbon atoms. Preferably, the $R^7$ and $R^8$ radicals are each linear.

These aldimines of the formula (IV) enable odorless compositions having a very particularly low tendency to cause stress cracks in glassy thermoplastics.

In a further preferred embodiment, Z is a radical of the formula

Preferably, $R^1$ and $R^2$ here are each a methyl radical.

Preferably, $R^3$ here is a hydrogen radical.

Preferably, Y here is and $R^4$ is a linear alkyl radical having 11 carbon atoms. These aldimines of the formula (IV) enable odorless compositions having particularly high elasticity, which cause barely any stress cracks in glassy thermoplastics.

Preferably, Y here is additionally and $R^5$ and $R^6$ together are a 3-oxa-1,5-pentylene radical which, together with the nitrogen atom, forms a morpholine ring. These aldimines of the formula (IV) enable low-odor compositions having particularly high strength, which do not cause any stress cracks in glassy thermoplastics, even in the presence of zirconium(IV) catalysts.

Preferably, Y here is additionally and $R^5$ and $R^6$ are each 2-hydroxyethyl or 2-hydroxypropyl. These aldimines of the formula (IV) enable odorless compositions in which the aldehyde released is incorporated into the crosslinked composition in the course of curing, as a result of which these compositions do not cause any migration-related defects.

More particularly, the latent hardener is selected from the group consisting of N,N'-bis(4-alkylbenzylidene)hexane-1,6-diamine, N,N'-bis(2,2-dimethyl-3-lauroyloxypropylidene) hexamethylene-1,6-diamine, N,N'-bis(2,2-dimethyl-3-(N-morpholino)propylidene)hexamethylene-1,6-diamine, N,N'-bis(2,2-dimethyl-3-bis(2-hydroxyethyl)aminopropylidene) hexamethylene-1,6-diamine, N,N'-bis(2,2-dimethyl-3-bis(2-hydroxypropyl)aminopropylidene)hexamethylene-1,6-diamine, N,N'-bis(4-alkylbenzylidene)-1-amino-3-aminomethyl-3,5,5-trimethylcyclohexylamine, N,N'-bis(2,2-dimethyl-3-lauroyloxypropylidene)-1-amino-3-aminomethyl-3,5,5-trimethylcyclohexane, N,N'-bis(2,2-dimethyl-3-(N-morpholino)propylidene)-1-amino-3-aminomethyl-3,5,5-trimethylcyclohexane, N,N'-bis(2,2-dimethyl-3-bis(2-hydroxyethyl)aminopropylidene)-1-amino-3-aminomethyl-3,5,5-trimethylcyclohexane, N,N'-bis(2,2-dimethyl-3-bis(2-hydroxypropyl)aminopropylidene)-1-amino-3-aminomethyl-3,5,5-trimethylcyclohexane, N,N'-bis(4-alkylbenzylidene)polyoxypropylenediamine, N,N'-bis(2,2-dimethyl-3-lauroyloxypropylidene)polyoxypropylenediamine, N,N'-bis(2,2-dimethyl-3-(N-morpholino)propylidene)polyoxypropylenediamine, N,N'-bis(2,2-dimethyl-3-bis(2-hydroxyethyl)aminopropylidene)polyoxypropylenediamine, N,N'-bis(2,2-dimethyl-3-bis(2-hydroxypropyl)aminopropylidene)polyoxypropylenediamine, N,N',N''-tris(4-alkylbenzylidene)polyoxypropylenetriamine, N,N',N''-tris(2,2-dimethyl-3-lauroyloxypropylidene)polyoxypropylenetriamine, N,N',N''-tris(2,2-dimethyl-3-(N-morpholino)propylidene) polyoxypropylenetriamine, N,N',N''-tris(2,2-dimethyl-3-bis (2-hydroxyethyl)aminopropylidene)polyoxypropylenetriamine, N,N',N''-tris(2,2-dimethyl-3-bis(2-hydroxypropyl) aminopropylidene)polyoxypropylenetriamine, N-4-alkylbenzylidene-2-(2-aminoethoxy)ethanol, N-2,2-dimethyl-3-lauroyloxypropylidene-2-(2-aminoethoxy)ethanol and N-2,2-dimethyl-3-(N-morpholino)propylidene-2-(2-aminoethoxy)ethanol, where alkyl in each case is a branched decyl, undecyl, dodecyl, tridecyl or tetradecyl radical.

These aldimines are easily obtainable and enable two-component polyurethane compositions having particularly good mechanical properties.

Among these, preference is given to N,N'-bis(2,2-dimethyl-3-lauroyloxypropylidene)hexamethylene-1,6-diamine, N,N'-bis(2,2-dimethyl-3-(N-morpholino)propylidene)hexamethylene-1,6-diamine, N,N'-bis(2,2-dimethyl-3-lauroyloxypropylidene)-1-amino-3-aminomethyl-3,5,5-trimethylcyclohexane, N,N'-bis(2,2-dimethyl-3-(N-morpholino)propylidene)-1-amino-3-aminomethyl-3,5,5-trimethylcyclohexane, N,N'-bis(2,2-dimethyl-3-lauroyloxypropylidene)polyoxypropylenediamine having an average molecular weight in the range from 730 to 950 g/mol, N,N'-bis(2,2-dimethyl-3-(N-morpholino)propylidene)polyoxypropylenediamine having an average molecular weight in the range from 500 to 750 g/mol, N,N',N'''-tris(2,2-dimethyl-3-lauroyloxypropylidene)polyoxypropylenetriamine having an average molecular weight in the range from 1'200 to 1'300 g/mol or N-2,2-dimethyl-3-lauroyloxypropylidene-2-(2-aminoethoxy)ethanol.

These aldimines are particularly easily obtainable, are liquid at room temperature and enable low-odor or odorless compositions having trouble-free curing and the good mechanical properties described.

The latent hardener is present in the composition in such an amount that the ratio of the number of reactive groups in the latent hardener to the number of OH groups present is in the range from 0.02 to 0.4. This counts both blocked and unblocked reactive groups in the latent hardener. An oxazolidino group is counted as two reactive groups since an oxazolidino group releases one secondary amino group and one hydroxyl group.

Given the small amount of latent hardener, a surprisingly distinct increase in the strength of the composition is found, without any significant influence on other good properties of the composition such as, in particular, stretching or low glass transition temperature or low temperature dependence of the mechanical properties.

Preferably, the abovementioned ratio is in the range from 0.04 to 0.3. In this ratio, materials with particularly high strength and/or stretching are obtained.

The composition may comprise further constituents in the first and/or second component.

The first component optionally comprises further substances reactive with isocyanate groups, especially di- or polyfunctional alcohols, polyphenols, polythiols, polyamines or amino alcohols.

The first component may additionally contain further polyols, especially commercial polyols such as, in particular:

polyether polyols, especially polyoxyalkylenediols and/or polyoxyalkylenetriols, especially polymerization products of ethylene oxide or 1,2-propylene oxide or 1,2- or 2,3-butylene oxide or oxetane or tetrahydrofuran or mixtures thereof, where these may have been polymerized with the aid of a starter molecule having two or more active hydrogen atoms, especially a starter molecule such as water, ammonia or a compound having multiple OH or NH groups, for example ethane-1,2-diol, propane-1,2- or -1,3-diol, neopentyl glycol, diethylene glycol, triethylene glycol, the isomeric dipropylene glycols or tripropylene glycols, the isomeric butanediols, pentanediols, hexanediols, heptanediols, octanediols, nonanediols, decanediols, undecanediols, cyclohexane-1,3- or -1,4-dimethanol, bisphenol A, hydrogenated bisphenol A, 1,1,1-trimethylolethane, 1,1,1-trimethylolpropane, glycerol or aniline, or mixtures of the aforementioned compounds. Likewise suitable are polyether polyols with polymer particles dispersed therein, especially styrene-acrylonitrile particles (SAN) or polyurea or polyhydrazodicarbonamide particles (PHD).

Polyester polyols, especially from the polycondensation of hydroxycarboxylic acids, or especially those prepared from di- to trihydric, especially dihydric, alcohols, for example ethylene glycol, diethylene glycol, propylene glycol, dipropylene glycol, neopentyl glycol, butane-1,4-diol, pentane-1,5-diol, 3-methylhexane-1,5-diol, hexane-1,6-diol, octane-1,8-diol, decane-1,10-diol, dodecane-1,12-diol, 1,12-hydroxystearyl alcohol, 1,4-cyclohexanedimethanol, dimer fatty acid diol (dimer diol), neopentyl glycol hydroxypivalate, glycerol, 1,1,1-trimethylolpropane or mixtures of the aforementioned alcohols, with organic di- or tricarboxylic acids, especially dicarboxylic acids, or anhydrides or esters thereof, such as, in particular, succinic acid, glutaric acid, adipic acid, trimethyladipic acid, suberic acid, azelaic acid, sebacic acid, dodecanedicarboxylic acid, maleic acid, fumaric acid, dimer fatty acid, phthalic acid, phthalic anhydride, isophthalic acid, terephthalic acid, dimethyl terephthalate, hexahydrophthalic acid, trimellitic acid or trimellitic anhydride, or mixtures of the aforementioned acids, and also polyester polyols formed from lactones such as, in particular, ε-caprolactone and starters such as the aforementioned di- or trihydric alcohols. Polyester diols are particularly suitable.

Polycarbonate polyols as obtainable by reaction, for example, of the abovementioned alcohols—used to form the polyester polyols—with dialkyl carbonates, diaryl carbonates or phosgene.

Block copolymers bearing at least two hydroxyl groups and having at least two different blocks having polyether, polyester and/or polycarbonate structure of the type described above, especially polyether polyester polyols.

Polyacrylate polyols and polymethacrylate polyols.

Polyhydroxy-functional fats and oils, for example natural fats and oils, especially castor oil; or polyols obtained by chemical modification of natural fats and oils—called oleochemical polyols—for example the epoxy polyesters or epoxy polyethers obtained by epoxidation of unsaturated oils and subsequent ring opening with carboxylic acids or alcohols, or polyols obtained by hydroformylation and hydrogenation of unsaturated oils; or polyols obtained from natural fats and oils by degradation processes such as alcoholysis or ozonolysis and subsequent chemical linkage, for example by transesterification or dimerization, of the degradation products or derivatives thereof thus obtained. Suitable degradation products of natural fats and oils are especially fatty acids and fatty alcohols and also fatty acid esters, especially the methyl esters (FAME), which can be derivatized to hydroxy fatty acid esters by hydroformylation and hydrogenation for example.

Polyhydrocarbon polyols, also called oligohydrocarbonols, for example polyhydroxy-functional polyolefins, polyisobutylenes, polyisoprenes; polyhydroxy-functional ethylene-propylene, ethylene-butylene or ethylene-propylene-diene copolymers as produced, for example, by Kraton Polymers; polyhydroxy-functional polymers of dienes, especially of 1,3-butadiene, which can especially also be prepared from anionic polymerization; polyhydroxy-functional copolymers of dienes such as 1,3-butadiene or diene mixtures and vinyl monomers such as styrene, acrylonitrile, vinyl chloride, vinyl acetate, vinyl alcohol, isobutylene and isoprene, for example polyhydroxy-functional acrylonitrile/butadiene copolymers as preparable, for example, from epoxides or amino alcohols and carboxyl-terminated acrylonitrile/butadiene copolymers (commercially available, for example, under the Hypro® CTBN or CTBNX or ETBN name from Emerald Performance Materials); and hydrogenated polyhydroxy-functional polymers or copolymers of dienes.

Preference is given to polyols having an average molecular weight in the range from 500 to 10,000 g/mol, especially 500 to 6,000 g/mol.

Preference is given to polyols having an average OH functionality in the range from 1.6 to 3, especially 1.8 to 3.

Preference is given to polyols that are liquid at room temperature.

Preference is given to hydrophobic polyols, especially polyhydroxy-functional fats and oils, polyhydrocarbon polyols or polyether, polyester or polycarbonate polyols having a repeat unit having at least four carbon atoms. The presence of such hydrophobic polyols in not too high an amount does not too significantly impair the described good properties of the composition.

In a preferred embodiment of the invention, the first component additionally comprises at least one hydrophobic diol having an average molecular weight in the range from 500 to 3,000 g/mol, selected from the group consisting of polyether diols, polybutadiene diols, polycarbonate diols, polyester diols and mixed forms of these diols, each having a repeat unit having at least 4 carbon atoms.

Among these, preference is given to polycarbonate diols, polyester diols and polyestercarbonate diols each having a repeat unit having at least 4 carbon atoms.

A composition of this kind enables particularly good bonding properties, especially to polycarbonate substrates.

The hydrophobic diol preferably has an average molecular weight in the range from 500 to 2,000 g/mol, more preferably 750 to 1,500 g/mol, especially 750 to 1,000 g/mol. A composition of this kind enables particularly good bonding properties and particularly high strengths.

Preferably, the hydrophobic diol is an aliphatic or cycloaliphatic diol free of aromatic constituents.

A particularly suitable hydrophobic polyester diol is a condensation product of 3-methylpentane-1,5-diol and adipic acid or sebacic acid. Polyester diols of this kind are available, for example, under the Kuraray P2010 trade name from Kuraray.

A particularly suitable hydrophobic aliphatic polycarbonate diol is based on 3-methylpentane-1,5-diol and hexane-1,6-diol and is available, for example, under the Kuraray C2050 trade name from Kuraray.

A particularly suitable hydrophobic aliphatic polyester carbonate diol based on hexane-1,6-diol and ε-caprolactone is available under the Desmophen® C 1200 trade name from Bayer Covestro.

Preferably, the first component contains a content of hydrophobic diol in the range from 5% to 19% by weight, especially 5% to 15% by weight, based on the total amount of all polyols having an average molecular weight of at least 500 g/mol.

Preferably, the first component contains only a small content of non-hydrophobic polyols, if any. It preferably contains, based on the total amount of all polyols having an average molecular weight of at least 500 g/mol, not more than 15% by weight, more preferably not more than 10% by weight, especially not more than 5% by weight, most preferably no, non-hydrophobic polyols. Non-hydrophobic polyols are especially polyether or polyester or polycarbonate polyols that do not contain any repeat units having at least 4 carbon atoms, especially polyoxyethylene polyols, polyoxypropylene polyols or mixed polyols thereof.

In addition, the first component may comprise a chain extender.

Suitable for this purpose are diols having two primary hydroxyl groups and a molecular weight in the range from 60 to 150 g/mol, especially ethane-1,2-diol, propane-1,3-diol, 2-methylpropane-1,3-diol, butane-1,4-diol, pentane-1,5-diol, neopentyl glycol, hexane-1,6-diol, 3-methylpentane-1,5-diol, heptane-1,7-diol, octane-1,8-diol, cyclohexane-1,3-dimethanol, cyclohexane-1,4-dimethanol, diethylene glycol or triethylene glycol. Among these, preference is given to diols having at least 4 carbon atoms, especially 2-methylpropane-1,3-diol, butane-1,4-diol, pentane-1,5-diol, neopentyl glycol, hexane-1,6-diol, 3-methylpentane-1,5-diol or cyclohexane-1,4-dimethanol.

The diol forms what are called hard segments with the polyisocyanate in the cured material and hence enables cured compositions with particularly high strengths.

Preferably, the first component, based on the total amount of all polyols having an average molecular weight of at least 500 g/mol, contains only small proportions of chain extenders, preferably not more than 5% by weight, more preferably not more than 2% by weight and most preferably none. A high content of chain extenders moves the glass transition temperature in the direction of higher temperature and may result in further glass transition temperatures, which is disadvantageous for uniform mechanical properties within a wide temperature range.

In addition, the first component may comprise further di- or polyfunctional alcohols, such as, in particular, butane-1,2-diol, butane-1,3-diol, pentane-1,3-diol, dibromoneopentyl glycol, hexane-1,2-diol, octane-1,2-diol, 2-ethylhexane-1,3-diol, ethoxylated bisphenol A, propoxylated bisphenol A, cyclohexanediol, hydrogenated bisphenol A, dimer fatty acid alcohols, 1,1,1-trimethylolethane, 1,1,1-trimethylolpropane, glycerol, pentaerythritol, sugar alcohols such as, in particular, xylitol, sorbitol or mannitol, or sugars such as, in particular, sucrose, or alkoxylated derivatives of the alcohols mentioned or mixtures of the alcohols mentioned.

In addition, the first component may additionally comprise at least one primary polyamine such as, in particular, 4(2)-methylphenylene-1,3-diamine (TDA), 3,5-diethyltolylene-2,4(6)-diamine (DETDA), 3,5-dimethylthiotolylene-2,4(6)-diamine, 4,4'-diaminodiphenylmethane (MDA), 3,3',5,5'-tetraethyl-4,4'-diaminodiphenylmethane (M-DEA), 1,5-diamino-2-methylpentane (MPMD), 2,2(4),4-trimethylhexamethylenediamine (TMD), 1,2-diaminocyclohexane, bis(4-aminocyclohexyl)methane, 1-amino-3-aminomethyl-3,5,5-trimethylcyclohexane (isophorondiamine or IPDA), 4(2)-methyl-1,3-cyclohexanediamine, 1,3-bis(aminomethyl)cyclohexane, 1,4-bis(aminomethyl)cyclohexane, 2,5(2,6)-bis(aminomethyl)bicyclo[2.2.1]heptane (NBDA), 1,3-bis(aminomethyl)benzene (MXDA), 1,4-bis(aminomethyl)benzene or polyoxyalkylenepolyamines having an average molecular weight in the range from 200 to 500 g/mol, especially the Jeffamine® products D-230, D-400 or T-403 (all from Huntsman).

A primary polyamine of this kind can especially directly alter the flow properties of the composition on mixing of the two components so as to give rise to a structurally viscous material that flows away or slips away to a lesser degree. This is also referred to as "in situ thixotropy".

In addition, the first component may additionally comprise at least one amine hardener having two sterically and/or electronically strongly deactivated amino groups, such as, in particular, a p-aminobenzoic diester, especially of a polytetramethylene oxide diol, especially Versalink® P-650 or Versalink® P-1000 (both from Air Products).

Preferably, the first component contains only small amounts, if any, of di- or polyfunctional alcohols, primary polyamines or amine hardeners, preferably less than 5% by weight, more preferably less than 2% by weight, especially less than 1% by weight, most preferably no, di- or polyfunctional alcohols, primary polyamines or amine hardeners.

In addition, the first component may additionally comprise water, especially in such an amount that the first component contains up to 2% by weight, especially up to 1% by weight, of water. The water is preferably bound to a support material. The presence of water in the composition facilitates the hydrolysis of aldimino groups, or it proceeds substantially independently from the diffusion of water into the mixed composition applied from the environment, which results in more rapid curing.

The second component optionally comprises at least one polyurethane polymer containing isocyanate groups.

A polyurethane polymer of this kind is especially obtained from the reaction of at least one polyol with a superstoichiometric amount of at least one polyisocyanate, especially a diisocyanate. The reaction is preferably conducted with exclusion of moisture at a temperature in the range from 20 to 160° C., optionally in the presence of suitable catalysts.

The excess of polyisocyanate is preferably chosen so as to leave, in the polyurethane polymer after the conversion of all hydroxyl groups, a content of free isocyanate groups in the range from 1% to 30% by weight, preferably 1.5% to 25% by weight, more preferably 2% to 20% by weight, based on the overall polymer. The polyurethane polymer can optionally be prepared with additional use of plasticizers or solvents, in which case the plasticizers or solvents used do not contain any groups reactive toward isocyanates.

The polyurethane polymer containing isocyanate groups preferably has a mean molecular weight in the range from 350 to 6,000 g/mol.

Preferred polyisocyanates for preparation of a polyurethane polymer containing isocyanate groups are the diisocyanates mentioned, especially MDI, TDI, IPDI, HDI or $H_{12}$MDI, most preferably MDI.

More preferably, the polyurethane polymer containing isocyanate groups is based on the same polyisocyanate as already present in the second component.

Suitable polyols are especially the polyols mentioned as a possible constituent of the first component, especially the hydrophobic polyols having a repeat unit having at least 4 carbon atoms that have been mentioned. rewritten paragraph:

Preference is given to polyols having an average molecular weight in the range from 500 to 10,000 g/mol, especially from 500 to 6,000 g/mol.

Preference is given to polyols having an average OH functionality in the range from 1.6 to 3. Preference is given to polyols that are liquid at room temperature.

In addition, the composition may comprise further auxiliaries and additives. These may be present in the first component or in the second component or in both components.

Preferably, the composition comprises at least one catalyst for curing, especially at least one catalyst for the hydrolysis of aldimine groups and/or at least one catalyst for the reaction of isocyanate groups.

Preferably, the composition comprises both at least one catalyst for the hydrolysis of aldimine groups and at least one catalyst for the reaction of isocyanate groups.

Suitable catalysts for the hydrolysis of aldimine groups are especially organic acids, especially carboxylic acids such as 2-ethylhexanoic acid, lauric acid, stearic acid, isostearic acid, oleic acid, neodecanoic acid, benzoic acid, salicylic acid or 2-nitrobenzoic acid, organic carboxylic anhydrides such as phthalic anhydride, hexahydrophthalic anhydride or methylhexahydrophthalic anhydride, silyl esters of carboxylic acids, organic sulfonic acids such as methanesulfonic acid, p-toluenesulfonic acid or 4-dodecylbenzenesulfonic acid, sulfonic esters, other organic or inorganic acids, or mixtures of the aforementioned acids and acid esters. Particular preference is given to carboxylic acids, especially aromatic carboxylic acids such as benzoic acid, 2-nitrobenzoic acid or especially salicylic acid.

Suitable catalysts for the reaction of isocyanate groups are especially organotin(IV) compounds such as, in particular, dibutyltin diacetate, dibutyltin dilaurate, dibutyltin dichloride, dibutyltin diacetylacetonate, dimethyltin dilaurate, dioctyltin diacetate, dioctyltin dilaurate or dioctyltin diacetylacetonate, compounds of iron(III), bismuth(III) or zirconium(IV), especially complexes, or nitrogen-containing compounds such as, in particular, 1,4-diazabicyclo[2.2.2]octane (DABCO), 1,8-diazabicyclo[5.4.0]undec-7-ene (DBU), 1,5-diazabicyclo[4.3.0]non-5-ene (DBN) or monocyclic amidines such as, in particular, derivatives of imidazoline or 1,4,5,6-tetrahydropyrimidine, especially 1-(3-dimethylaminopropyl)-2-methyl-1,4,5,6-tetrahydropyrimidine.

Preferably, the composition comprises at least one nitrogen-containing compound as catalyst for curing, especially DABCO. In the context of this invention, it has been found that the use of a nitrogen-containing compound as catalyst, especially DABCO, enables particularly high strengths, whereas Bi(III) catalysts or Zr(IV) catalysts give reduced strength. This is particularly surprising, given that the prior art describes, for two-component polyurethane compositions comprising polyols and latent hardeners, particularly high strengths in the case of use of Bi(III) catalysts or Zr(IV) catalysts, whereas DABCO as catalyst therein results in significantly reduced strengths.

Most preferably, the composition comprises a combination of salicylic acid and DABCO.

Preferably, DABCO is a constituent of the first component.

Preferably, the composition furthermore comprises at least one filler.

Suitable fillers are especially ground or precipitated calcium carbonates, optionally coated with fatty acids, especially stearates, or barytes, quartz flours, quartz sands, dolomites, wollastonites, kaolins, calcined kaolins, sheet silicates such as mica or talc, zeolites, aluminum hydroxides, magnesium hydroxides, silicas including finely divided silicas from pyrolysis processes, cements, gypsums, fly ashes, industrially produced carbon blacks, graphite, metal powders, for example of aluminum, copper, iron, silver or steel, PVC powders or hollow beads.

The addition of fillers is advantageous in that it affects the rheological properties and it is possible to increase the strength of the composition. The use of carbon black especially also increases the creep resistance of the composition, which is preferable. Preference is given to industrially produced carbon black.

The proportion of the fillers in the overall composition is preferably in the range from 5% to 60% by weight, more preferably 5% to 50% by weight, especially 10% to 45% by weight. The proportion of carbon black is preferably in the range from 1% to 15% by weight, especially 5% to 15% by weight.

The composition may comprise further auxiliaries and additives commonly used for polyurethane compositions, especially pigments, plasticizers, reactive plasticizers, fibers, dyes, desiccants, adhesion promoters, further catalysts that accelerate the reaction of isocyanate groups, rheology modifiers, especially thickeners, natural resins, fats or oils, non-reactive polymers, especially homo- or copolymers of unsaturated monomers, flame-retardant substances, wetting agents, leveling agents, defoamers, dearating agents, stabilizers against oxidation, heat, light or UV radiation, biocides, or further substances that are typically used in polyurethane compositions.

It may be advisable to chemically or physically dry certain substances before mixing them into the composition.

Preferably, the composition comprises at least one adhesion promoter, especially an organoalkoxysilane, especially an epoxysilane such as, in particular, 3-glycidoxypropyltrimethoxysilane or 3-glycidoxypropyltriethoxysilane, a (meth)acryloylsilane, anhydridosilane, carbamatosilane, alkylsilane or iminosilane, or oligomeric forms of these silanes, or a titanate.

Preferably, the composition comprises only a small amount of plasticizer, especially less than 10% by weight, preferably less than 5% by weight, more preferably less than 1% by weight, of plasticizer. Thus, weakening of adhesive bonds or seals by plasticizers that migrate out of the cured composition can be largely prevented.

Preferably, the first component of the composition comprises
  30% to 90% by weight, preferably 40% to 80% by weight, especially 50% to 70% by weight, of polyols having an average molecular weight of at least 500 g/mol and latent hardeners,
  10% to 60% by weight, especially 20% to 50% by weight, of fillers,
and optionally further constituents.

A particularly preferred first component of the composition comprises
  40% to 70% by weight of polybutadiene polyols having an average molecular weight in the range from 2,000 to 10,000 g/mol and an average OH functionality in the range from 2.1 to 4,
  0.5% to 10% by weight of latent hardeners,
  20% to 50% by weight of fillers
  salicylic acid and/or DABCO,
  and optionally further constituents.

Preferably, the second component of the composition comprises 50% to 100% by weight, preferably 80% to 100% by weight, especially 90% to 100% by weight, of a room temperature liquid form of MDI.

Preferably, the composition after curing has an elongation at break in the range from 100% to 500%, preferably 130% to 400%.

Further preferably, the composition after curing has a modulus of elasticity within the range from 0.5% to 5% elongation in the range from 4 to 8 MPa, especially 4.5 to 7 MPa.

Further preferably, the composition after curing has a glass transition temperature below −45° C., especially below −50° C.

It is especially preferable when the composition after curing fulfills all the specifications above in relation to elongation at break, modulus of elasticity and glass transition temperature. A material of this kind has the advantageous properties described to a particular degree.

The first and second components of the composition are produced separately from one another. This is done by mixing the ingredients of the respective component with one another with exclusion of moisture. Each component is stored in a separate moisture-tight container until the composition is used. A suitable moisture-tight container especially consists of an optionally coated metal and/or plastic, and is especially a vat, a container, a hobbock, a bucket, a can, a bag, a tubular bag, a canister, a cartridge or a tube. Each component is storage-stabilized on its own.

For application of the composition, the two components are mixed with one another by a suitable method shortly before or during the application. The mixing ratio is preferably chosen such that the groups reactive toward isocyanates are in a suitable ratio to the isocyanate groups.

The ratio of the groups reactive with isocyanates, especially hydroxyl groups, blocked amino groups such as, in particular, aldimine groups or oxazolidine groups, and primary and secondary amino groups, to the isocyanate groups here is preferably in the range from 0.5 to 1.2, more preferably 0.7 to 1.1, especially 0.8 to 1.0.

In parts by weight, the mixing ratio between the first and second components is typically in the range from about 1:1 to 20:1, especially 1:1 to 15:1.

The components are typically mixed via static mixers or with the aid of dynamic mixers, and the individual components may be prepared in the correct mixing ratio, or by machine by means of a two-component metering system. The mixing can be effected continuously or batchwise. In the mixing, it should be ensured that the two components are mixed with maximum homogeneity. In the event of inadequate mixing, local deviations from the advantageous mixing ratio will occur, which can result in a deterioration in the mechanical properties and/or blistering.

The mixing is preferably effected at ambient temperature, especially in the range from about 0 to 50° C., especially 10 to 40° C.

If mixing precedes the application, it is ensured that not too much time passes between the mixing of the components and the application, in order that there are no defects, for example poor leveling or slowed or incomplete buildup of adhesion to the substrate. More particularly, the open time of the composition should not be exceeded during the application.

The time until formation of a skin ("skin time") or until freedom from tack ("tack-free time") is a measure of the open time.

With the mixing of the two components, the process of curing commences. This results in the cured composition.

The curing can be effected at ambient temperature and/or at elevated temperature. It has been found that the composition of the invention is surprisingly robust in relation to curing at high temperatures, especially in the range from 60 to 130° C., typically giving rise to a blister-free material having good mechanical properties.

In the curing, the hydroxyl groups and any primary or secondary amino groups present react with isocyanate groups present. The blocked amino groups in the latent hardener likewise react with isocyanate groups present under the influence of moisture. Any further isocyanate groups present react with one another under the influence of moisture. The totality of these reactions that lead to curing of the composition is also referred to as crosslinking.

The moisture required for reaction of the blocked amino groups may at least partly be present in the composition, and/or can get into the composition by diffusion from the environment, especially from the air (air humidity) or from the substrates. In addition, it is possible to deliberately supply the composition with moisture from the outside, for example by, in the mixing of the first and second component, adding a further water-containing or water-releasing component, or by contacting the mixed material with moisture or water, for example by spraying.

The crosslinking releases an aldehyde or ketone from the blocked amino groups under the influence of moisture, and this, depending on its volatility, remains in or diffuses gradually out of the composition. Owing to the small amount of latent hardener in the composition, this is a comparatively small amount of aldehyde or ketone, which is advantageous in relation to shrinkage and/or migration effects. In the preferred case that the latent hardener present is an aldimine of the formula (IV), the crosslinking releases a largely nonvolatile and low-odor or odorless aldehyde of the formula especially 4-alkylbenzaldehyde in which alkyl is a branched decyl, undecyl, dodecyl, tridecyl or tetradecyl radical, or 2,2-dimethyl-3-lauroyloxypropanal or 2,2-dimethyl-3-(N-morpholino)propanal, which remains for the most part in the cured composition where it has good compatibility and behaves like a plasticizer. Its influence is minor owing to the small amount and good compatibility. Moreover, it causes no stress cracking, or does so only in combination with ingredients that are not preferred, in combination with glassy thermoplastics such as polycarbonate, polymethylmethacrylate or polystyrene.

The composition is advantageously usable as sealant or adhesive or potting compound.

The present invention thus further provides for the use of the composition described as elastic adhesive or sealant, especially for bonding or sealing of plastics, composite materials or mixed bonds between metals and plastics in the construction and manufacturing industries and in motor vehicle construction, especially for the bonding of installable components, assembly, bodywork bonding, module bonding, window glass bonding, headlamp bonding, seam sealing or cavity sealing, wherein the two components are mixed and the mixed composition is applied to at least one substrate and then cured, optionally after contacting with a further substrate within the open time.

The present invention further provides a product from the use of the composition described which is obtained after the composition has cured.

The invention further relates to a method of bonding a first substrate to a second substrate, comprising the steps of:
mixing the first and second components described above,
applying the mixed composition to at least one of the substrate surfaces to be bonded, and
joining the two substrates within the open time of the mixed composition.

These two substrates may consist of the same material or different materials.

Suitable substrates are especially
glass, glass ceramic, glass mineral fiber mats;
metals or alloys, such as aluminum, copper, iron, steel, nonferrous metals, including surface-finished metals, or alloys such as galvanized or chromed metals;
coated or painted substrates, such as powder-coated metals or alloys or painted sheet metal;
plastics such as rigid or flexible PVC, polycarbonate, polyester, polystyrene, polyamide, PMMA, ABS, SAN, epoxy resins, phenolic resins, PUR, POM, TPO, PE, PP, EPM or EPDM, in each case untreated or surface-treated, for example by means of plasma, corona or flames;
fiber-reinforced plastics, such as carbon fiber-reinforced plastics (CFP), glass fiber-reinforced plastics (GFP) or sheet molding compounds (SMC);
wood, woodbase materials bonded with resins, for example phenolic, melamine or epoxy resins, resin-textile composites or further polymer composites; or
concrete, mortar, fiber cement, especially fiber cement boards, brick, tile, gypsum, especially gypsum boards, or natural stone such as granite, limestone, sandstone or marble.

It is possible to bond and/or seal two identical or two different substrates.

In said method, one or both of the substrates is preferably a metal, a glass ceramic or a glass, a glass fiber-reinforced plastic or a carbon fiber-reinforced plastic, an epoxy-based thermoset or a polymer substrate having low surface energy, such as a polyolefin, polymethylmethacrylate or polycarbonate substrate.

More particularly, one or both of the substrates is a metal, a ceramic, a glass fiber-reinforced plastic, a carbon fiber-reinforced plastic or a polymer substrate having low surface energy, such as a polyolefin, polymethylmethacrylate or polycarbonate substrate.

Especially preferably, one or both of the substrates is a metal, especially steel, or a polymer substrate having low surface energy, such as polyolefin, polymethylmethacrylate or polycarbonate.

The substrates can be pretreated if required prior to the application of the composition. Pretreatments of this kind especially include physical and/or chemical cleaning methods, and the application of an adhesion promoter, an adhesion promoter solution or a primer.

The invention further relates to a method of sealing, especially of joins and gaps, comprising the steps of:
mixing the first and second components described above,
applying the mixed composition to a substrate or between two substrates within the open time of the mixed composition.

In these methods of sealing, the substrates mentioned above for the method of adhesive bonding are particularly suitable.

More preferably, in the method of bonding or in the method of sealing, at least one of the substrates is a glassy thermoplastic selected from the group consisting of polycarbonate, polymethylmethacrylate and polystyrene. This substrate has a particularly low tendency, if any, to stress cracks.

The composition described is likewise advantageously usable as a potting compound.

The composition described features high strength and elasticity, which is relatively constant over a broad temperature range from about −40° C. to 90° C., and has good, largely temperature-independent bonding properties to metallic and nonmetallic substrates. Owing to these properties, it is particularly suitable as an elastic adhesive for bonds that are subjected to stress outdoors. By virtue of the high proportion of polybutadiene polyol, the cured composition is very hydrophobic and water-repellent. This can promote high water vapor diffusion resistance of the material. As a result, the composition is also especially suitable for bonds or as a potting compound where water vapor-sensitive components, for example electronic components or headlamps, are to be sealed with adhesive bonding.

EXAMPLES

Working examples are adduced hereinafter, which are intended to elucidate the invention described in detail. It will be appreciated that the invention is not restricted to these described working examples.

"Standard climatic conditions" refer to a temperature of 23±1° C. and a relative air humidity of 50±5%.

1. Commercial Substances Used:

| | |
|---|---|
| Poly bd ® R45 | Polybutadiene polyol, OH functionality about 2.5, average molecular weight about 2800 g/mol, OH number 47.1 mg KOH/g (Poly bd ® R-45HTLO from Cray Valley) |
| Kuraray P2010 | Polyester diol, average molecular weight about 2000 g/mol, OH number 56 mg KOH/g (Kuraray P-2010 from Kuraray) |
| Voranol ® CP 4755 | EO-endcapped polyoxypropylenetriol, OH number 35 mg KOH/g (from Dow) |
| Filler | Mineral filler based on calcium carbonate (Winnofil ® SPT from Solvay) |
| Carbon black | Monarch ® 120 (from Cabot) |
| DABCO | 1,4-diazabicyclo[2.2.2]octane, 33% by weight in dipropylene glycol (DABCO 33 LV ® from Air Products) |
| Zr catalyst | Zirconium(IV) chelate complex in reactive diluent and tert-butyl acetate, zirconium content 3.5% by weight (K-Kat ® A-209 from King Industries) |
| Salicylic acid 5% | 5% by weight of salicylic acid in dioctyl adipate |
| Polyisocyanate | Modified diphenylmethane diisocyanate containing MDI-carbodiimide adducts, liquid at room temperature, NCO content 29.4% by weight (Isonate ® M 143 from Dow) |

2. Preparation of Substances:

The amine content (total content of free and blocked amino groups including aldimino groups) was determined by means of titration (with 0.1N $HClO_4$ in acetic acid against crystal violet) and is reported in mmol N/g.

Aldimine-1: N,N'-bis(2,2-dimethyl-3-lauroyloxypropylidene)hexamethylene-1,6-diamine 622 g of 2,2-dimethyl-3-lauroyloxypropanal were initially charged in a round-bottom flask under a nitrogen atmosphere. While stirring, 166.0 g of hexamethylene-1,6-diamine solution (70% by weight in water) were added and then the volatile constituents were removed at 80° C. and a reduced pressure at 10 mbar. 702 g of an almost colorless liquid having an amine content of 2.85 mmol N/g were obtained, corresponding to a calculated aldimine equivalent weight of about 350 g/eq.

Aldimine-2: N,N'-bis(2,2-dimethyl-3-(N-morpholino)propylidene)hexamethylene-1,6-diamine 359.5 g of 2,2-dimethyl-3-(N-morpholino)propanal were initially charged in a round-bottom flask under a nitrogen atmosphere. While stirring, 166.0 g of hexamethylene-1,6-diamine solution (70% by weight in water) were added and then the volatile constituents were removed at 80° C. and a reduced pressure at 10 mbar. 439.1 g of an almost colorless liquid having an amine content of 9.27 mmol N/g were obtained, corresponding to a calculated aldimine equivalent weight of about 220 g/eq.

Amidine Catalyst: 1-(3-dimethylaminopropyl)-2-methyl-1,4,5,6-tetrahydropyrimidine A round-bottom flask was initially charged with 131.63 g of ethyl acetoacetate in 50 mL of toluene, and 161.09 g of $N^1$-((3-dimethylamino)propyl)-1,3-diaminopropane (from BASF) were slowly added dropwise while stirring and cooling, keeping the temperature at 20 to 30° C. Thereafter, the azeotrope of toluene and water was removed from the reaction mixture by means of distillation at 40° C. and 10 mbar, then residual toluene and ethyl acetate was removed by means of distillation under reduced pressure and the residue was distilled under reduced pressure. This gave 168.74 g of a yellowish oil having a boiling temperature at 95-105° C. at 0.6 mbar.

3. Production of Polyurethane Adhesives:

Examples K-1 to K-12 and Ref. 1 to Ref. 4

For each example, the ingredients specified in tables 1 to 3 were mixed in the specified amounts (in parts by weight) of the first component ("component-1") by means of a centrifugal mixer (SpeedMixer™ DAC 150, FlackTek Inc.) with exclusion of moisture to give a homogeneous paste and stored. The second component ("component-2") used was the amount (in parts by weight) of polyisocyanate specified in tables 1 and 2. The two components were processed by means of the centrifugal mixer with exclusion of moisture to give a homogeneous paste and the paste was immediately tested as follows:

As a measure of the open time, the Tack-free time was determined. For this purpose, a few grams of the adhesive were applied to cardboard in a layer thickness of about 2 mm and, under standard climatic conditions, the time until, when the surface of the adhesive was gently tapped by means of an LDPE pipette, there were for the first time no residues remaining any longer on the pipette was determined.

For determination of the mechanical properties, the adhesive was converted to dumbbell form according to ISO 527, Part 2, 1B, and stored/cured at 23° C. for 24 h and then at 80° C. for 3 h. After a conditioning time of 24 h, Tensile strength, Elongation at break and Modulus of elasticity at 0.5-5% extension of the test specimens thus produced were measured according to ISO 527 on a Zwick Z020 tensile tester at a testing speed of 200 mm/min. The modulus of elasticity values serve here as a measure for the strength of the adhesive. Lap shear strength (LSS for short) was measured by producing various test specimens, by applying the adhesive 1 minute after conclusion of the mixing time in each case between two heptane-degreased cathodically electrocoated steel sheets ("LSS e-coat") or isopropanol-degreased polycarbonate sheets (Makrolon®) ("LSS polycarb.") in a layer thickness of 1.6 mm and over an overlapping bonding area of 15×45 mm. The test specimens were stored/cured under standard climatic conditions for 24 h and then at 80° C. for 3 h. After a conditioning period of 24 h under standard climatic conditions, the tensile shear strength was determined according to DIN EN 1465 at a strain rate of 10 mm/min.

To determine whether bonded polycarbonate test specimens have a tendency to environmental stress cracking (ESC for short), further test specimens were produced. To this end, an isopropanol-degreased polycarbonate sheet with dimensions of 150×30 mm was covered with a film having an area of 30×30 mm and a thickness of 2 mm that had been cured under standard climatic conditions for 7 days such that the cured film came to rest in the middle of the polycarbonate sheet and was pressed on thoroughly by hand. Several test specimens of this kind were then clamped across a round piece of timber having a diameter of 35 mm that had been mounted on a board and secured at the ends such that each test specimen was fixed in a curved position. This arrangement was stored at 80° C. in an air circulation oven for 24 h, and then a visual assessment was made as to whether cracks were visible in the polycarbonate. If no cracks occurred in the polycarbonate, "ESC?" was answered "no", otherwise "yes".

Glass transition temperature, abbreviated in the tables to $T_g$, was determined from DMTA measurements on strip samples (height 2-3 mm, width 2-3 mm, length 8.5 mm) which were stored/cured at 23° C. for 24 h and then at 80° C. for 3 h, with a Mettler DMA/SDTA 861e instrument. The measurement conditions were: measurement in tensile mode, excitation frequency 10 Hz and heating rate 5 K/min. The samples were cooled down to −70° C. and heated to 200° C. with determination of the complex modulus of elasticity M* [MPa], and a maximum in the curve for the loss angle "tan δ" was read off as $T_g$.

The "Aldimine/OH ratio" in tables 1 to 3 referred to the ratio of the number of aldimine groups to the number of OH groups in the adhesive.

The results are reported in tables 1 to 3.

To determine the storage stability or aging stability or behavior under heat aging, further specimens were produced for some of the examples for determination of the mechanical properties and in some cases of tensile shear strength. These results are reported in table 4.

Storage stability of the first component was determined by storing it in a moisture-tight container at 60° C. for 7 days before using it to produce the test specimens. These values are identified in table 4 by "Comp.-1 aged". Aging stability was determined by storing further test specimens that had been cured/stored as described above, prior to the testing, additionally at 70° C. and 100% relative air humidity for 7 days and then conditioning them under standard climatic conditions for 24 h. These values are identified in table 4 by "+7 d 70° C./100% RH".

Behavior under heat aging was determined by producing further test specimens for determination of the mechanical properties which were stored/cured in an air circulation oven at 80/100/130° C. for 3 h and then conditioned under standard climatic conditions for 24 h. These values are identified in table 4 by "Curing 3h 80° C.", "Curing 3h 100° C." and "Curing 3h 130° C." respectively.

All the test specimens produced were visually impeccable, with a nontacky surface and free of blisters.

Examples K-1 to K-12 are adhesives of the invention. Examples Ref. 1 to Ref. 4 are comparative examples.

TABLE 1

| Example | Ref. 1 | K-1 | K-2 | K-3 | K-4 | K-5 | Ref. 2 |
|---|---|---|---|---|---|---|---|
| Component-1: | | | | | | | |
| Poly bd ® R45 | 60.00 | 60.00 | 60.00 | 60.00 | 60.00 | 60.00 | 60.00 |
| Aldimine-1 | — | 1.20 | 2.00 | 4.80 | — | — | 9.00 |
| Aldimine-2 | — | — | — | — | 0.70 | 3.00 | |
| Filler | 20.00 | 20.00 | 20.00 | 20.00 | 20.00 | 20.00 | 20.00 |
| Carbon black | 10.00 | 10.00 | 10.00 | 10.00 | 10.00 | 10.00 | 10.00 |
| DABCO | 0.10 | 0.10 | 0.10 | 0.10 | 0.10 | 0.10 | 0.10 |
| Salicylic acid 5% | 0.20 | 0.20 | 0.20 | 0.20 | 0.20 | 0.20 | 0.20 |
| Component-2: | | | | | | | |
| Polyisocyanate | 8.03 | 8.65 | 9.09 | 10.57 | 8.52 | 10.18 | 12.18 |
| Aldimine/OH ratio | — | 0.07 | 0.11 | 0.27 | 0.06 | 0.27 | 0.51 |
| Tack-free time [min.] | 18 | 15 | 15 | 13 | 10 | 10 | 18 |
| LSS e-coat [MPa] | 2.9 | 2.9 | 3.2 | 3.3 | 3.0 | 3.6 | 3.5 |
| LSS polycarb. [MPa] | 1.8 | 1.8 | 1.4 | 1.3 | 1.4 | 0.9 | 1.2 |
| ESC? | no | no | no | no | no | no | no |
| Tensile strength [MPa] | 3.7 | 3.3 | 3.4 | 4.2 | 3.7 | 4.3 | 3.2 |
| Elongation at break [%] | 233 | 201 | 193 | 185 | 198 | 148 | 97 |
| Modulus of elasticity [MPa] | 3.6 | 5.0 | 5.3 | 5.7 | 5.0 | 6.3 | 5.9 |
| $T_g$ [° C.] | −54 | −53 | −54 | −54 | −55 | −54 | −52 |

TABLE 2

| | Example | | | | |
|---|---|---|---|---|---|
| | Ref. 3 | K-6 | K-7 | K-8 | K-9 |
| Component-1: | | | | | |
| Poly bd ® R45 | 60.00 | 60.00 | 60.00 | 60.00 | 60.00 |
| Kuraray P2010 | 10.0 | 10.0 | 10.0 | 10.0 | 10.0 |
| Aldimine-1 | — | 2.00 | 4.80 | — | — |
| Aldimine-2 | — | — | — | 0.70 | 3.00 |
| Filler | 20.00 | 20.00 | 20.00 | 20.00 | 20.00 |
| Carbon black | 10.00 | 10.00 | 10.00 | 10.00 | 10.00 |
| DABCO | 0.10 | 0.10 | 0.10 | 0.10 | 0.10 |
| Salicylic acid 5% | 0.20 | 0.20 | 0.20 | 0.20 | 0.20 |
| Component-2: | | | | | |
| Polyisocyanate | 9.20 | 10.10 | 11.35 | 10.20 | 11.63 |
| Aldimine/OH ratio | — | 0.09 | 0.23 | 0.05 | 0.23 |
| Tack-free time [min.] | 15 | 23 | 20 | 12 | 7 |
| LSS e-coat [MPa] | 2.9 | 2.7 | 2.7 | 2.8 | 2.7 |
| LSS polycarb. [MPa] | 2.5 | 2.7 | 2.5 | 2.8 | 2.9 |
| ESC? | no | no | no | no | no |
| Tensile strength [MPa] | 3.7 | 3.7 | 3.4 | 4.0 | 3.7 |
| Elongation at break [%] | 275 | 233 | 212 | 207 | 141 |
| Modulus of elasticity [MPa] | 3.6 | 4.4 | 4.2 | 4.9 | 4.5 |
| $T_g$ [° C.] | −55 | −54 | −52 | −54 | −52 |

TABLE 3

| | Example | | | |
|---|---|---|---|---|
| | K-10 | K-11 | K-12 | Ref. 4 |
| Component-1: | | | | |
| Poly bd ® R45 | 60.00 | 60.00 | 60.00 | 30.00 |
| Voranol ® CP 4755 | — | — | — | 30.00 |
| Aldimine-1 | 2.00 | 3.00 | 2.00 | 1.20 |
| Aldimine-2 | — | — | — | — |
| Aldimine-3 | — | — | — | — |
| Filler | 20.00 | 20.00 | 20.00 | 20.00 |
| Carbon black | 10.00 | 10.00 | 10.00 | 10.00 |
| Amidine catalyst | 0.20 | 0.20 | — | — |
| Zr catalyst | — | — | 0.04 | 0.04 |
| Salicylic acid 5% | 0.20 | 0.20 | 0.20 | 0.20 |
| Component-2: | | | | |
| Polyisocyanate | 9.09 | 10.18 | 9.00 | 7.44 |
| Aldimine/OH ratio | 0.11 | 0.27 | 0.11 | 0.08 |
| Tack-free time [min.] | 8 | 5 | n.d. | 50 |
| LSS KTL [MPa] | 3.7 | 4.0 | 2.1 | 2.7 |
| LSS polycarb. [MPa] | 1.4 | 1.3 | n.d. | n.d. |
| ESC? | no | no | | |
| Tensile strength [MPa] | 4.5 | 3.9 | 3.4 | 2.7 |
| Elongation at break [%] | 212 | 118 | 253 | 208 |
| Modulus of elasticity [MPa] | 5.3 | 6.8 | 3.7 | 3.3 |
| $T_g$ [° C.] | −55 | −54 | −53 | −37 |

"n.d." stands for "not determined"

TABLE 4

| Example | Ref. 1 | K-2 | K-3 | K-4 | K-5 | Ref. 2 |
|---|---|---|---|---|---|---|
| Comp.-1 aged: | | | | | | |
| LSS e-coat [MPa] | 3.1 | 3.4 | 3.8 | 3.4 | 4.2 | n.d. |
| LSS polycarb. [MPa] | 2.3 | 1.4 | 1.9 | 1.6 | 1.4 | n.d. |
| ESC? | no | no | no | no | no | |
| Tensile strength [MPa] | 3.9 | 3.6 | 3.5 | 2.8 | 3.7 | n.d. |
| Elongation at break [%] | 203 | 147 | 108 | 115 | 117 | n.d. |
| Modulus of elasticity [MPa] | 4.9 | 5.9 | 6.4 | 5.5 | 6.6 | n.d. |
| +7 d 70° C./100% RH: | | | | | | |
| LSS e-coat [MPa] | 3.5 | 3.3 | 3.8 | 3.5 | 4.4 | n.d. |
| LSS polycarb. [MPa] | 1.0 | 1.7 | 1.3 | 1.1 | 1.1 | n.d. |
| Tensile strength [MPa] | 3.9 | 3.4 | 4.1 | 4.5 | 4.2 | n.d. |
| Elongation at break [%] | 240 | 149 | 135 | 148 | 218 | n.d. |
| Modulus of elasticity [MPa] | 4.0 | 5.6 | 7.1 | 4.5 | 4.8 | n.d. |
| Curing 3 h 80° C.: | | | | | | |
| Tensile strength [MPa] | 3.1 | 3.1 | 3.3 | 3.5 | n.d. | 2.0 |
| Elongation at break [%] | 231 | 157 | 153 | 201 | n.d. | 86 |
| Modulus of elasticity [MPa] | 4.0 | 5.2 | 5.2 | 4.9 | n.d. | 4.0 |
| Curing 3 h 100° C.: | | | | | | |
| Tensile strength [MPa] | 3.2 | 3.3 | 3.4 | 3.5 | n.d. | 2.8 |
| Elongation at break [%] | 238 | 163 | 112 | 183 | n.d. | 65 |
| Modulus of elasticity [MPa] | 4.1 | 5.4 | 6.5 | 5.2 | n.d. | 6.9 |
| Curing 3 h 130° C.: | | | | | | |
| Tensile strength [MPa] | 3.0 | 3.7 | n.d. | 3.5 | n.d. | n.d. |
| Elongation at break [%] | 183 | 157 | n.d. | 186 | n.d. | n.d. |
| Modulus of elasticity [MPa] | 4.3 | 5.5 | n.d. | 4.7 | n.d. | n.d. |

Figure 1:
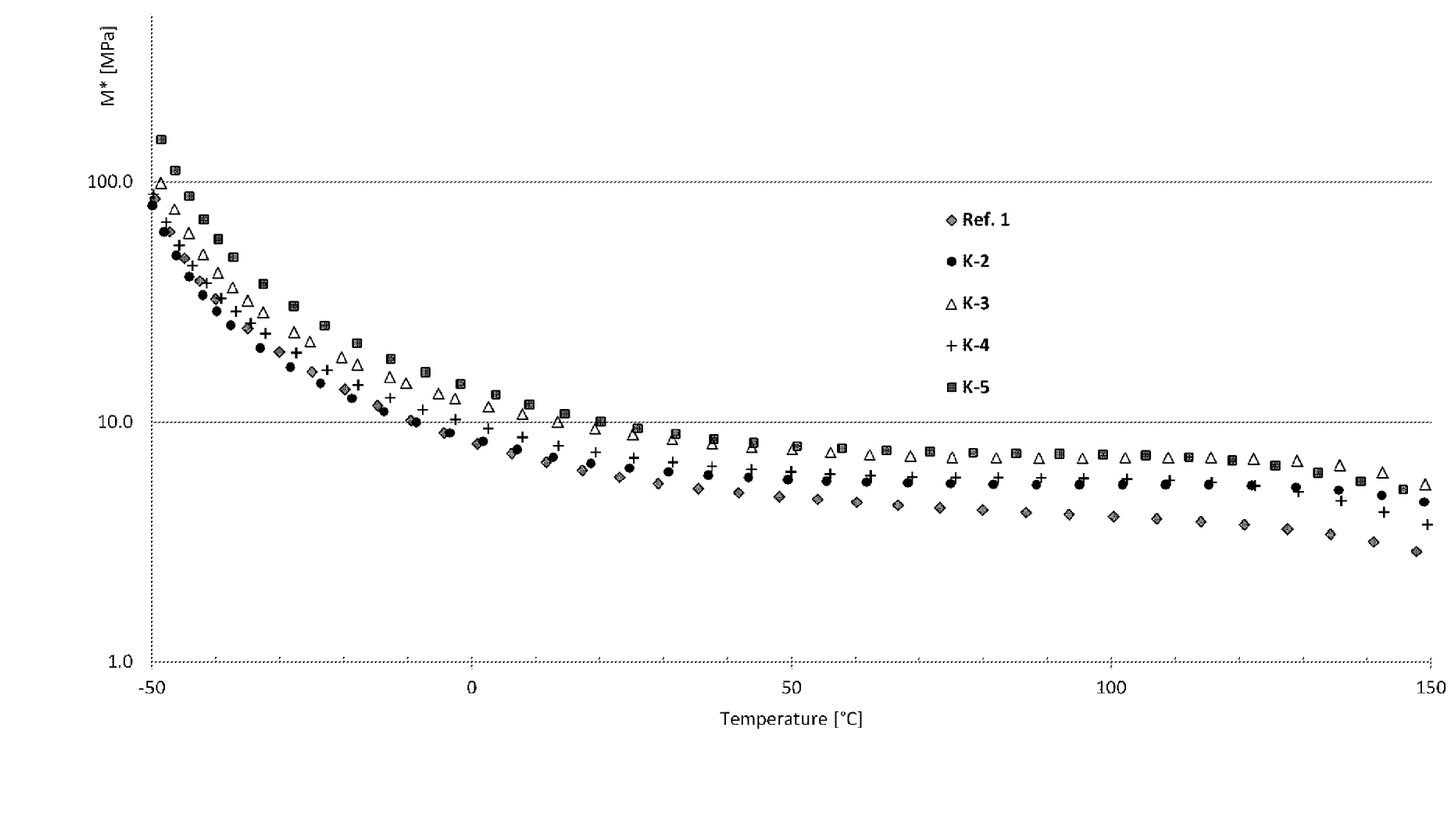

FIG. 1 shows the progression of the complex modulus of elasticity M* as a function of temperature for examples Ref. 1, K-2, K-3, K-4 and K-5, determined by means of DMTA as described above. The diagram serves as a measure for the constancy of the mechanical properties against temperature, and a flat curve profile represents high constancy.

It is clear from the curve profile that inventive examples K-2 to K-5 have higher strength and lower temperature dependence of strength across the temperature range shown, especially in the range from −40 to 90° C., than the comparative example Ref. 1.

The invention claimed is:
1. A composition consisting of
   a first component comprising at least 55% by weight of polybutadiene polyols having an average molecular weight in the range from 2,000 to 10,000 g/mol and an average OH functionality in the range from 2.1 to 4, based on the total amount of all polyols having an average molecular weight of at least 500 g/mol, and
   a second component comprising at least one polyisocyanate, where at least one of the two components additionally comprises at least one latent hardener, wherein the ratio of the number of reactive groups in the latent hardener to the number of OH groups present is in the range from 0.02 to 0.4.
2. The composition as claimed in claim 1, wherein the polyisocyanate comprises diphenylmethane 4,4'- or 2,4'- or 2,2'-diisocyanate or any mixture of these isomers.

3. The composition as claimed in claim 1, wherein the latent hardener is a blocked amine having a blocked, hydrolytically activatable amino group and at least one further reactive group selected from the group consisting of hydroxyl group, mercapto group, secondary amino group, primary amino group and blocked, hydrolytically activatable amino group.

4. The composition as claimed in claim 1, wherein the latent hardener is an aldimine of the formula (IV)

(IV)

where m is 0 or 1 and n is an integer from 1 to 3, where (m+n) is 2 or 3,

A is an (m+n)-valent hydrocarbyl radical optionally containing ether oxygen and having 2 to 20 carbon atoms, and

Z is an optionally substituted aromatic radical or a radical of the formula where $R^1$ and $R^2$ are each independently a monovalent hydrocarbyl radical having 1 to 12 carbon atoms, or together are a divalent hydrocarbyl radical having 4 to 12 carbon atoms which is part of an optionally substituted carbocyclic ring having 5 to 8 carbon atoms, $R^3$ is a hydrogen atom or an alkyl or arylalkyl or alkoxycarbonyl radical having 1 to 12 carbon atoms, and

Y is  where $R^4$ is a monovalent hydrocarbyl radical optionally containing ether or aldehyde units and having 6 to 20 carbon atoms, and

$R^5$ and $R^6$ are each independently a monovalent aliphatic, cycloaliphatic or arylaliphatic hydrocarbyl radical optionally containing heteroatoms in the form of hydroxyl groups or ether oxygen and having 2 to 20 carbon atoms, or together are a divalent aliphatic radical having 4 to 12 carbon atoms which is part of an optionally substituted heterocyclic ring having 5 to 8 ring atoms and as well as the nitrogen atom optionally contains further heteroatoms in the form of ether oxygen, thioether sulfur or tertiary amine nitrogen.

5. The composition as claimed in claim 4, wherein Z is a phenyl radical substituted by a branched alkyl group having 10 to 14 carbon atoms.

6. The composition as claimed in claim 4, wherein Z is a radical of the formula where $R^1$ and $R^2$ are each a methyl radical, $R^3$ is a hydrogen radical, Y is and $R^4$ is a linear alkyl radical having 11 carbon atoms.

7. The composition as claimed in claim 4, wherein Z is a radical of the formula where $R^1$ and $R^2$ are each a methyl radical, $R^3$ is a hydrogen radical, Y is and $R^5$ and $R^6$ together are a 3-oxa-1,5-pentylene radical which, together with the nitrogen atom, forms a morpholine ring.

8. The composition as claimed in claim 4, wherein Z is a radical of the formula where $R^1$ and $R^2$ are each a methyl radical, $R^3$ is a hydrogen radical, Y is and $R^5$ and $R^6$ are each 2-hydroxyethyl or 2-hydroxypropyl.

9. The composition as claimed in claim 1, wherein it contains at least one nitrogen-containing compound as catalyst for curing.

10. The composition as claimed in claim 1, wherein its glass transition temperature is below −45° C.

11. A method comprising applying the composition as claimed in claim 1 as elastic adhesive or sealant.

12. A product from the method as claimed in claim 11, which is obtained after the curing of the composition.

13. A method of bonding a first substrate to a second substrate, comprising the steps of:
- mixing the first and second components of the composition as claimed in claim 1,
- applying the mixed composition to at least one of the substrate surfaces to be bonded, and
- joining the two substrates within the open time of the mixed composition.

14. A method of sealing, comprising the steps of:
- mixing the first and second components of the composition as claimed in claim 1, and
- applying the mixed composition to a substrate or between two substrates within the open time of the mixed composition.

15. The method as claimed in claim 13, wherein at least one of the substrates is a glassy thermoplastic selected from the group consisting of polycarbonate, polymethylmethacrylate and polystyrene.

* * * * *